DE. LANCY KENNEDY.
DEVICE FOR SECURING THE TINES OF HAY TEDDERS.
No. 110,856. Patented Jan. 10, 1871.
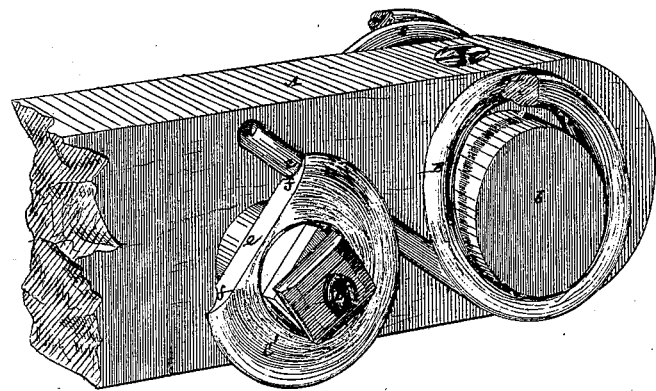
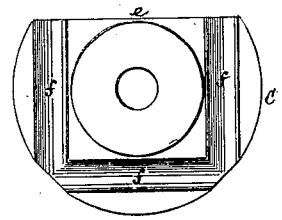
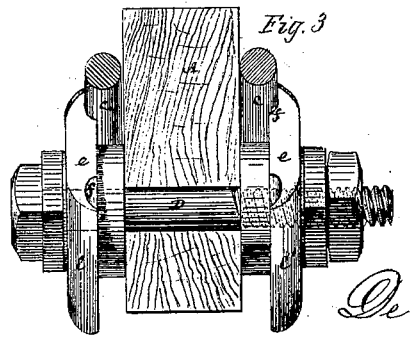

United States Patent Office.

DE LANCY KENNEDY, OF NEW YORK, N. Y.

Letters Patent No. 110,856, dated January 10, 1871.

IMPROVEMENT IN DEVICES FOR SECURING THE TINES OF HAY-TEDDERS.

The Schedule referred to in these Letters Patent and making part of the same.

*To all whom it may concern:*

Be it known that I, DELANCY KENNEDY, of the city, county, and State of New York, have invented a new and useful Improvement in Clamping Devices for the Tines of Hay-Tedders or Spreaders, of which the following is a full, clear, and exact description, reference being had to the accompanying drawing forming a part of this specification, and in which—

Figure 1 represents a view in perspective of the bar of a hay-tedder fork, in part, with my improvement for holding the tines to their places applied thereto;

Figure 2 is a face view of one of the clamps or buttons by which the tines are secured; and Figure 3, a transverse section through the bar, with the tines and clamping devices in their places thereon.

Similar letters of reference indicate corresponding parts.

My invention has reference to a mode of fastening the tines to the bars of the forks of a hay-tedder or spreader, and providing for the removal of the same when required, substantially as described in Letters Patent of the United States (No. 80,412) issued to me July 28, 1868, and in which the upper parts of the tines of the fork, after being coiled around a transverse stud in the lower end of the bar, have their terminal portions extended beyond the coils, and the extremities of such terminal portions bent to enter holes in the bar, where they are retained by overlapping flanges on buttons or clamps, which are secured upon each side of the arm by a bolt passing through them and the bar, said buttons or clamps having a portion of their overlapping flanges cut away so that there is one position to which if they are turned they will not retain the tines; which allows of the removal of one or both of the tines on opposite sides of the bar, for the insertion of new tines, or for any other purpose that may be necessary.

This invention consists in a grooved construction of the buttons or clamps on the inside faces of their overlapping flanges, whereby they are made to receive within them the terminal portions or inner extensions of the tines, and are thereby locked or prevented from shifting or turning when set to hold the tines, and whereby the terminal portions of the tines are braced.

Referring to the accompanying drawing—

A represents one of the bars, in part, of a hay-tedder fork; and

B B, the rear or upper portions of the tines, coiled to fit the ends of a transverse stud, *b*, in the lower end of the bar A, but not fixedly attached thereto; and having their terminal portions *c* extended beyond the coils in what may be termed an upward direction, and the extremities of such terminal portions bent as at *d*, which bent portions enter holes in the bar, where they are retained by the overlapping flanges of the buttons or clamps C C', secured upon each side of the arm by a bolt, D, passing through them and the bar.

These clamps are cut away for a portion of their flanges, as at *e*, to facilitate, by suitably turning them, the insertion and removal of the tines as hereinbefore referred to.

The one (C) of them may be fitted loosely on the bolt D; but the other (C') be arranged to screw thereon, and answering in the place of a nut, although an additional lock-nut may, if desired, be used to hold the clamps to their grip on the terminal portions of the tines.

To prevent said buttons or clamps C C' from being turned accidentally or working so as to bring the cut-away portion *e* of them into its uncovering position of the tines, said clamps are formed with grooves, *f*, on the inside faces of their overlapping flanges, which grooves serve to receive within them the terminal portions *c* of the tines, thereby locking the clamp from turning, and bracing said portions of the tines. These grooves may either be single or there may be a series of them, running at suitable angles, the one into the other, as represented in fig. 2, to allow of the lock of the clamp on the tines in different positions of the former, to suit different thicknesses of tines, or as other circumstances may require.

What is here claimed, and desired to be secured by Letters Patent, is—

The grooves *f* in the buttons or clamps C C', in combination with the terminal portions *c* of the tines, substantially as specified.

DE LANCY KENNEDY.

Witnesses:
FRED. HAYNES,
R. E. RABEAU.